US007232079B2

(12) United States Patent
Courian et al.

(10) Patent No.: US 7,232,079 B2
(45) Date of Patent: Jun. 19, 2007

(54) DETERMINING WHETHER THERMAL FLUID-EJECTION NOZZLE EJECTED FLUID UPON FIRING BASED ON TEMPERATURE AND/OR RESISTANCE

(75) Inventors: Kenneth J. Courian, San Diego, CA (US); John Wade, Ramona, CA (US); Xavier Soler, Barcelona (ES); Carlos Boy, Barcelona (ES); Tom Dragnes, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 399 days.

(21) Appl. No.: 10/661,796

(22) Filed: Sep. 12, 2003

(65) Prior Publication Data

US 2005/0077377 A1 Apr. 14, 2005

(51) Int. Cl.
*A01G 27/00* (2006.01)
*B05B 1/24* (2006.01)

(52) U.S. Cl. ............................ 239/67; 239/68; 239/69; 239/70; 239/128; 239/134

(58) Field of Classification Search .................. 239/67, 239/68, 69, 70, 71, 1, 3, 128, 133, 134, 135
See application file for complete search history.

(56) References Cited

U.S. PATENT DOCUMENTS

| | | | | |
|---|---|---|---|---|
| 5,825,975 | A * | 10/1998 | Privas | 392/404 |
| 6,164,564 | A * | 12/2000 | Franco et al. | 239/284.1 |
| 6,460,964 | B2 * | 10/2002 | Osborne | 347/19 |
| 6,827,782 | B2 * | 12/2004 | Goto et al. | 118/667 |

OTHER PUBLICATIONS

Bill Osborne, "Nucleation experiments with Thermal Ink Jet Thin Film Resistors," Final Report submitted in partial fulfillment of the requirements for the degree of Master of Engineering, Cornell University, Aug. 1996.

* cited by examiner

*Primary Examiner*—Davis Hwu

(57) ABSTRACT

A method of one embodiment of the invention is disclosed that determines the temperature and/or firing resistance of a thermal fluid-ejection nozzle as the fluid-ejection nozzle is fired. The method determines whether the fluid-ejection nozzle ejected fluid upon firing based on the temperature and/or firing resistance of the fluid-ejection nozzle.

20 Claims, 5 Drawing Sheets

DETERMINING WHETHER THERMAL FLUID-EJECTION NOZZLE EJECTED FLUID UPON FIRING BASED ON TEMPERATURE AND/OR RESISTANCE

BACKGROUND

Inkjet-printing devices, which are generally referred to as fluid-ejection devices, have become popular in residential, business, and industrial settings. They have proven to be a cost-effective manner by which to output black-and-white and color images onto media, such as paper and other types of media. Inkjet-printing devices generally work by ejecting ink from a number of inkjet-printing nozzles onto the media. In a thermal inkjet-printing device, a resistive element within a nozzle is heated, causing ink to be ejected from the nozzle. The ink is more generally fluid, and the inkjet-printing nozzles are more generally fluid-ejection nozzles.

The inkjet-printing nozzles of inkjet-printing devices occasionally clog, inhibiting their ability to eject ink. The ink may dry over an inkjet-printing nozzle, such that a spitting or a wiping process is performed to clear the nozzle so that it can again properly eject ink. When one or more of the inkjet-printing nozzles of an inkjet-printing device clogs, the quality of the resulting output on media may degrade. For example, streaks may become evident on the media, and where the image being output onto the media includes text, the text may become illegible.

Determining whether an inkjet-printing nozzle is clogged is usually an offline process that cannot be performed while the inkjet-printing device is being used to output images onto media. Some inkjet print jobs may take hours or days to complete, and usually cannot be interrupted once started to perform an offline process. Thus, such print jobs may mean that the inkjet-printing device is not able to determine whether nozzles have clogged for hours or days, while the print jobs are being completed.

SUMMARY

A method of one embodiment of the invention determines the temperature and/or firing resistance of a thermal fluid-ejection nozzle as the fluid-ejection nozzle is fired. The method determines whether the fluid-ejection nozzle ejected fluid upon firing based on the temperature and/or firing resistance of the fluid-ejection nozzle.

BRIEF DESCRIPTION OF THE DRAWINGS

The drawings referenced herein form a part of the specification. Features shown in the drawing are meant as illustrative of only some embodiments of the invention, and not of all embodiments of the invention, unless explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the embodiments of the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1A:
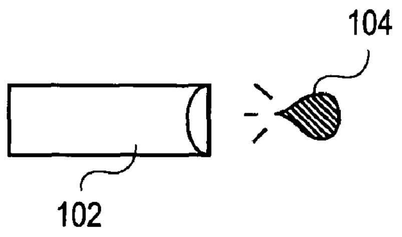
FIGS. 1A and 1B are representative diagrams of an unclogged fluid-ejection nozzle and a clogged fluid-ejection nozzle, respectively, according to an embodiment of the invention.
Figure 1B:
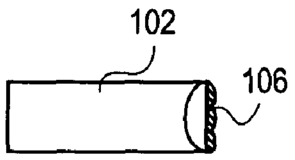

FIGS. 1A and 1B show a representative fluid-ejection nozzle 102, according to an embodiment of the invention. The fluid-ejection nozzle 102 may be one of a number of fluid-ejection nozzles on one or more fluid-ejection mechanisms of a fluid-ejection device. For example, the fluid-ejection nozzle 102 may be one of a number of inkjet-printing nozzles on one or more inkjet printheads of an inkjet-printing device, such as an inkjet printer. The nozzle 102 is depicted by itself and having a size significantly larger than actual size in FIGS. 1A and 1B for illustrative clarity. The fluid-ejection nozzle 102 is specifically a thermal fluid-ejection nozzle, as may be a part of a thermal fluid-ejection mechanism of a thermal fluid-ejection device.

In FIG. 1A, the fluid-ejection nozzle 102 has been fired, and the fluid-ejection nozzle 102 has successfully ejected a fluid drop 104. The firing of the fluid-ejection nozzle 102 means that the nozzle 102 has been caused to attempt to eject fluid, like the fluid drop 104. In thermal-type fluid-ejection devices, a resistor within the nozzle 102 is heated, which expands a vapor bubble to cause the nozzle 102 to attempt to eject fluid.

In FIG. 1B, the fluid-ejection nozzle 102 has been fired, but the nozzle 102 is clogged and does not eject a fluid drop. For instance, extraneous fluid 106 may have dried over the nozzle 102, preventing the nozzle from successfully ejecting fluid drops. The nozzle 102 may be partially or completely clogged, or otherwise may partially or completely fail to eject a fluid drop. Where the nozzle 102 completely fails to eject a fluid drop, no fluid is ejected when the nozzle 102 is fired. Where the nozzle 102 partially fails to eject a fluid drop, a malformed fluid drop, or a smaller than desired fluid drop, may be ejected, or undesirable aerosol may be ejected in lieu of a fluid drop.

Figure 2:
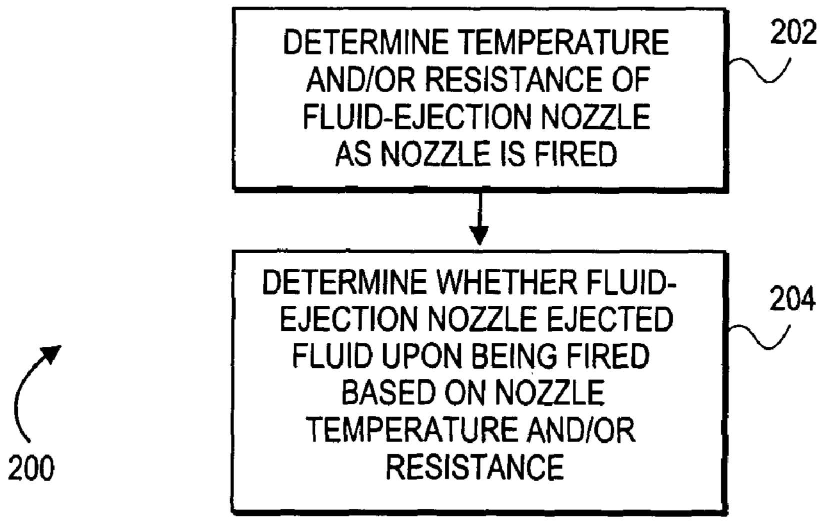
FIG. 2 is a flowchart of a method for determining whether a fluid-ejection nozzle has ejected fluid upon being fired, according to an embodiment of the invention.

FIG. 2 shows a method 200 for determining whether a fluid-ejection nozzle has ejected fluid upon being fired, according to an embodiment of the invention. Like other methods of embodiments of the invention, the method 200 may be implemented as a computer program stored on a computer-readable medium. The medium may be a volatile or a non-volatile medium. The medium may be a semiconductor medium, such as a semiconductor memory like flash memory or random-access memory, a magnetic medium, such as a floppy disk or a hard disk drive, and/or an optical medium, such as a compact disc (CD)-type medium or a digital versatile disc (DVD)-type medium.

The temperature, the firing resistance, or both the temperature and the resistance of a fluid-ejection nozzle are determined as the nozzle is fired to attempt to eject fluid from the nozzle (202). The temperature and/or the firing resistance may be directly determined, or measured, or they may be indirectly determined, or measured. For instance, the temperature may be proportional to the firing resistance of the nozzle. Determining the temperature and/or the firing resistance of the fluid-ejection nozzle can be accomplished while the fluid-ejection nozzle is actively attempting to eject fluid as part of a fluid-ejection job, such as an inkjet print job. That is, the fluid-ejection nozzle's temperature and/or firing resistance can be determined while the nozzle is online. The firing resistance of the nozzle is the resistance of the nozzle when it is fired. The term resistance as used herein specifically relates to firing resistance.

Furthermore, the fluid-ejection nozzle, or the fluid-ejection mechanism of which it is a part, may not have to be moved to a particular location within the fluid-ejection device of which it is also a part for its temperature and/or resistance to be determined. The fluid-ejection nozzle may be part of a stationary fluid-ejection mechanism, such as a stationary inkjet printhead, that cannot normally be moved within the device. In other words, the fluid-ejection nozzle's temperature and/or resistance may be determined while the fluid-ejection nozzle is actively performing a fluid-ejection job, and while the nozzle is in its current location.

The method 200 then determines whether the fluid-ejection nozzle has successfully ejected fluid upon being fired, based on the nozzle's temperature and/or resistance (204). That is, whether the fluid-ejection nozzle has successfully ejected fluid can be determined based on indirectly measuring nozzle temperature through a change in firing resistance. The nozzle's temperature and/or resistance can be directly used to determine whether the nozzle has successfully ejected fluid, or can be indirectly used to determine whether the nozzle has successfully ejected fluid. Determining whether the fluid-ejection nozzle has successfully ejected fluid upon being fired is, for instance, tantamount to determining whether the fluid-ejection nozzle is partially or completely clogged and thus partially or completely unable to eject fluid.

The temperature of the fluid-ejection nozzle can be measured in a variety of different ways. Measuring the firing resistance of the nozzle is an indirect measurement of the temperature of the nozzle. A temperature sensor may also be included within the nozzle so that the nozzle's temperature can be directly measured, or an infrared optical sensor may be employed to measure the temperature of the nozzle.

Embodiments of the invention generally correlate performance of a thermal fluid-ejection nozzle with the temperature of the nozzle itself, while and after firing has occurred, where the temperature of the nozzle may be indirectly determined by measuring the firing resistance of the nozzle, and in particular the change in firing resistance of the nozzle. The temperature of the nozzle can thus be measured during and after firing to determine the performance of the nozzle—that is, whether or not the nozzle has successfully ejected fluid. The next three sections of the detailed description describe different particular approaches that can be used, in conjunction with the method 200 of FIG. 2, to determine whether a fluid-ejection nozzle has successfully ejected fluid upon being fired based on the temperature and/or resistance of the nozzle.

Using Nozzle Resistance Over Voltage to Determine Whether Nozzle has Fired

Figure 3:
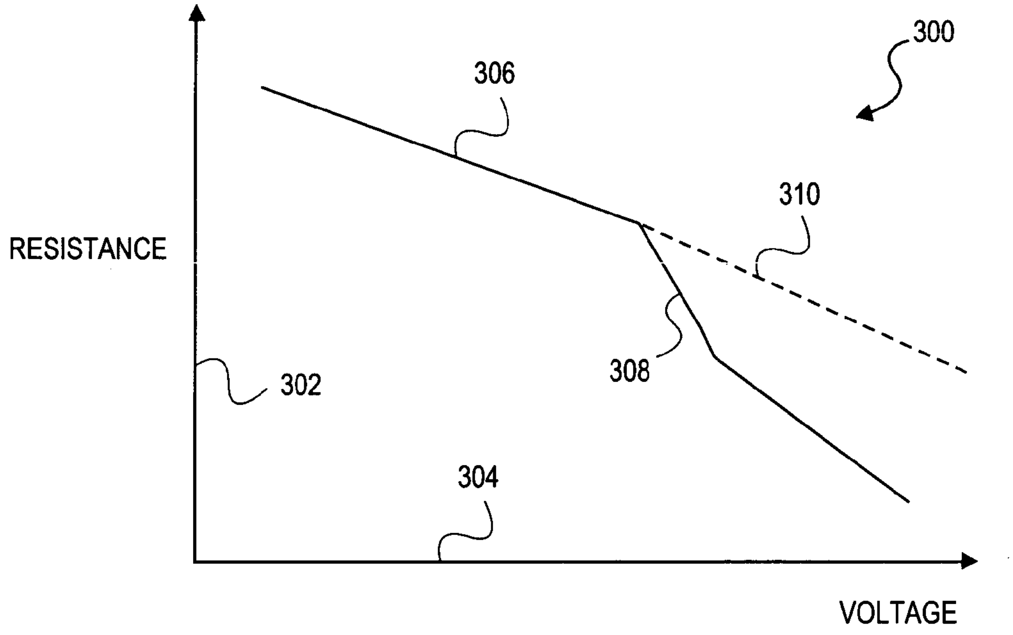
FIG. 3 is a graph of the resistance of a fluid-ejection nozzle as the voltage applied to the nozzle is increased while multiple firings of the nozzle occur to eject fluid, according to an embodiment of the invention.

FIG. 3 shows a graph 300 of the resistance of a fluid-ejection nozzle as a function of the voltage applied to the nozzle as the nozzle is fired, according to an embodiment of the invention. The y-axis 302 denotes resistance, and the resistance may range from 625 ohms at the bottom of the y-axis 302 to 675 ohms 302 at the top of the y-axis 302. The resistance denoted by the y-axis 302 may be average resistance measured during multiple firings. The x-axis 302 denotes voltage, and the voltage may range from 22 volts at the left of the x-axis 302 to 31 volts at the right of the x-axis 302.

As the fluid-ejection nozzle is repeatedly fired, the voltage applied to the nozzle is increased. The resistance of the fluid-ejection nozzle as measured during each firing decreases at a substantially constant rate, as indicated by the line segment 306. When the fluid-ejection nozzle ejects a fluid drop, the resistance of the nozzle decreases more quickly, at a faster rate than before the nozzle ejected fluid, as indicated by the line segment 308. However, when the fluid-ejection nozzle completely or partially fails to eject a fluid drop, the resistance of the nozzle does not decrease at a substantially faster rate than before the nozzle ejected fluid, as indicated by the dotted line segment 310.

The resistance profile of the fluid-ejection nozzle over voltage therefore differs, depending on whether the nozzle has successfully ejected fluid or not. If the resistance continues to decrease at substantially the same rate throughout the firing process, as indicated by the line segments 306 and 310, then the nozzle has not ejected fluid. If the resistance decreases first at a slower rate and then at a faster rate within the firing process, as indicated by the line segments 306, and 308, then the nozzle has ejected fluid. The profile encompassing the line segments 306 and 310 thus differs from the profile encompassing the line segments 306 and 308.

Figure 4:
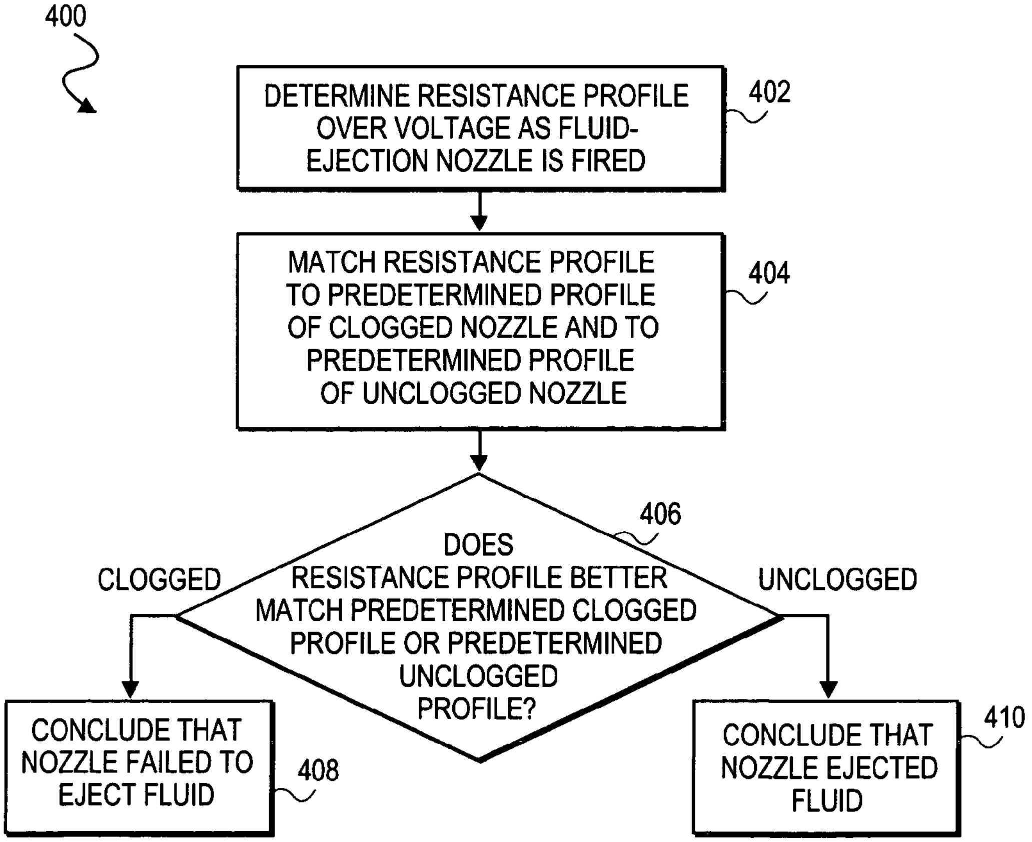
FIG. 4 is a flowchart of a method for using the resistance of a fluid-ejection nozzle over the voltage applied to the nozzle to determine whether the nozzle has ejected fluid upon being fired, according to an embodiment of the invention.

FIG. 4 shows a method 400 for determining whether a fluid-ejection nozzle has successfully ejected fluid upon being fired by using the resistance of the nozzle over voltage, according to an embodiment of the invention. First, the resistance profile over voltage is determined, such as by being measured, as the fluid-ejection ejection nozzle is fired (402). Next, the resistance profile that has been determined is matched against two predetermined profiles: a resistance profile over voltage of a clogged nozzle, and a resistance profile over voltage of an unclogged profile (404). The former profile may encompass the line segments 306 and 308 of FIG. 3, whereas the latter profile may encompass the line segments 306 and 310 of FIG. 3.

If the resistance profile of the fluid-ejection nozzle better matches the predetermined clogged profile (406), then the method 400 concludes that the nozzle has failed to eject fluid (408). For instance, the nozzle may be completely or partially clogged. If the resistance profile of the nozzle better matches the predetermined unclogged profile (406), then the method 400 concludes that the nozzle has successfully ejected fluid. That is, the method 400 concludes that the fluid-ejection nozzle is substantially unclogged.

The method 400 has been described in relation to determining the profile of the resistance of a fluid-ejection nozzle over the voltage applied to the nozzle. The resistance may be directly or indirectly measured or otherwise determined. The method 400 is also alternatively applicable to determining the profile of the resistance of the nozzle over time, or the profile of the temperature of the nozzle over time or voltage. In these latter embodiments, the temperature may be either directly or indirectly measured or otherwise determined. The temperature profile that is determined is thus matched to a clogged temperature profile and an unclogged temperature profile.

In an alternative embodiment to that described in conjunction with FIGS. 3 and 4, the resistance profile is not measured, but rather a resistance at a particular point in time is measured. This resistance is then compared against a threshold. Depending on the value of the resistance vis-à-vis the threshold, it is concluded whether or not the fluid-ejection nozzle successfully ejected fluid.

Furthermore, other alternative embodiments may also utilize the temperature of the fluid-ejection nozzle to determine whether nozzle has successfully ejected fluid. For instance, in another embodiment, the temperature of the resistive element within the nozzle may be sampled using multiple pulses. The temperature measurement uses the thermal coefficient of the resistance of the resistive element material. By monitoring the voltage across the resistive element, and the current through the element, the resistance and therefore the temperature of the fluid-ejection nozzle can be measured as firing occurs.

The fluid-ejection firing chamber of the fluid-ejection nozzle is emptied of fluid during a successful firing, and is then refilled. During firing, some of the fluid is ejected, and some is caused to go back to a fluid reservoir, partially emptying an inlet channel connecting the reservoir with the chamber. If the resistive element is fired again, before refilling has occurred, it is surrounded with fluid vapor, and heats up much more quickly and to a higher temperature than when it was surrounded by fluid. This is because the fluid is usually a much better conductor of heat than the fluid vapor, and slows the heating process.

As a result, the resistance of the resistive element achieves a different value on the second firing if refilling has not occurred. If the nozzle is clogged, the fluid in the chamber is emptied back into the reservoir area, with vapor occupying the inlet channel. The refill process again occurs, but since the inlet channel is devoid of fluid, the process takes more time than before. If the second firing pulse occurs when fluid has refilled the chamber, and the nozzle is operating properly, the resistance of the second pulse is similar to the first pulse. However, if the nozzle is clogged, the chamber takes longer to refill, and if refilling has not yet occurred when the second pulse arrives, the resistance differs from the first pulse.

Therefore, by using two or more pulses, the refill time can be detected and compared with a normal refill time, based on the resistance (and hence the temperature) of the fluid-ejection nozzle. If the refill time is large, and thus greater than a threshold, it can be inferred that the nozzle is clogged. The refill-time comparison of this approach can be accomplished very quickly, using the same nozzle for both pulses, and can be quickly repeated to achieve statistical confidence and thus to improve the signal to noise ratio in the measurement performed.

Using Nozzle Temperature Over Time to Determine Whether Nozzle has Fired

Figure 5:
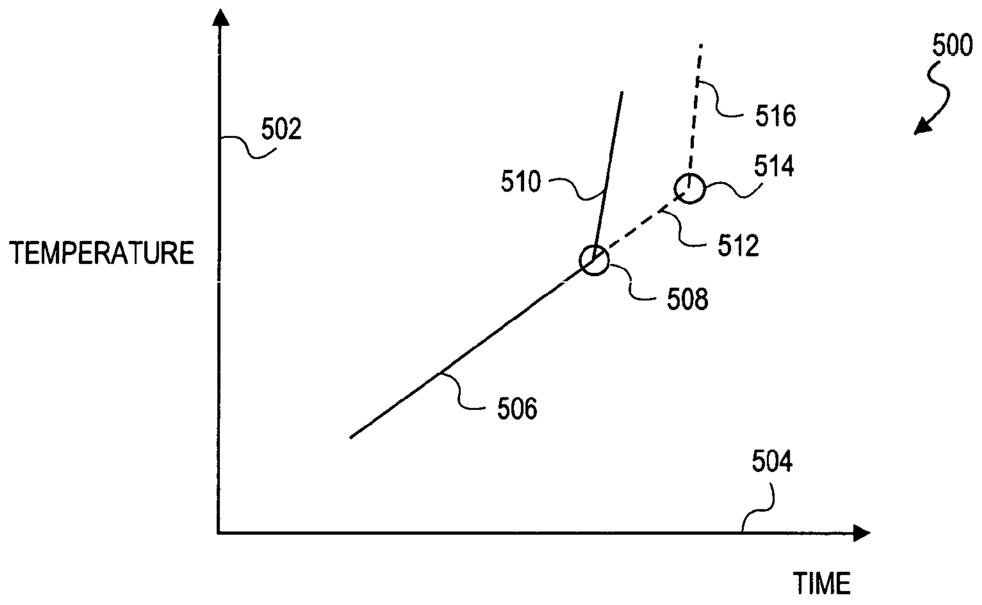
FIG. 5 is a graph of the temperature of a fluid-ejection nozzle over time during a firing pulse to eject fluid, according to an embodiment of the invention.

FIG. 5 shows a graph 500 of the temperature of a fluid-ejection nozzle as a function of time as the nozzle is fired, according to an embodiment of the invention. The y-axis 502 denotes temperature, and the temperature may range from 400 degrees C. at the bottom of the y-axis 502 to 600 degrees C. at the top of the y-axis 502. The x-axis 504 denotes time, and the time may range from 0 seconds at the left of the x-axis 504 to 3 microseconds at the right of the x-axis 504.

When the fluid-ejection nozzle is fired, the temperature of the nozzle increases at a substantially constant rate, as indicated by the line segment 506. When the fluid-ejection nozzle ejects a fluid drop at the time indicated by the point 508, the temperature of the nozzle begins to increase more quickly, at a faster rate than before the nozzle ejected fluid, as indicated by the line segment 308. The temperature at which the nozzle's temperature begins to increase more quickly is referred to as the transition temperature. The transition temperature is the temperature at which the fluid nucleates within the nozzle, or, in other words, the temperature at which fluid nucleation occurs.

However, when the fluid-ejection nozzle completely or partially fails to eject a fluid drop, the temperature of the nozzle does not begin to increase more quickly until a later time, as indicated by the point 512. Thus, the temperature continues to increase at substantially the same rate, as indicated by the line segment 506 and the dotted line segment 512, until the point 512 is reached, at which the temperature increases more quickly, at a faster rate, as indicated by the dotted line segment 516. Therefore, the transition temperature corresponding to the point 508 when the nozzle ejects fluid is lower than the transition temperature corresponding to the point 512 when the nozzle fails to partially or completely eject fluid.

Figure 6:
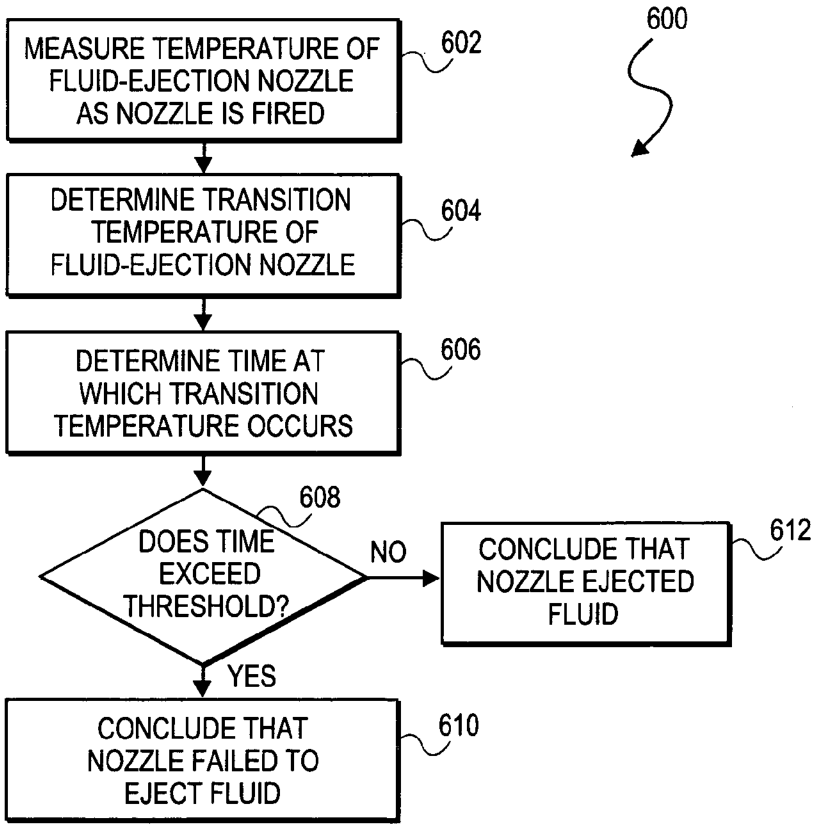
FIG. 6 is a flowchart of a method for using the temperature of a fluid-ejection nozzle over time to determine whether the nozzle has ejected fluid upon being fired, according to an embodiment of the invention.

FIG. 6 shows a method 600 for determining whether a fluid-ejection nozzle has successfully ejected fluid upon being fired by determining the time relative to the beginning of a firing pulse at which the transition temperature of the nozzle occurs, according to an embodiment of the invention. First, the temperature of the fluid-ejection nozzle is measured over time as the nozzle is fired (602). Based on this information, the transition temperature of the nozzle is determined (604). For instance, the transition temperature may be determined as the time at which the rate of temperature increase changes from a slower rate to a faster rate.

The time at which the transition temperature of the fluid-ejection nozzle occurs is also determined (606). If this time is greater than a threshold (608), then the method 600 concludes that the nozzle has partially or completely failed to eject fluid. If the time at which the transition temperature occurs is less than or equal to the threshold (608), then the method 600 concludes that the nozzle has successfully ejected fluid. The threshold may be determined as a time between the times at which the points 508 and 514 of FIG. 5 are located.

The method 600 has been described in relation to determining the transition temperature of a fluid-ejection nozzle, determining the time at which the transition temperature occurred, and comparing this time to a threshold. Alternatively, the transition temperature may itself be compared to a threshold, where exceeding the threshold corresponds to the nozzle failing to eject fluid, and not exceeding the threshold corresponds to the nozzle ejecting fluid. The temperature of the nozzle may be directly or indirectly measured or otherwise determined.

Using Nozzle Voltage Over Time to Determine Whether Nozzle has Fired

Figure 7:
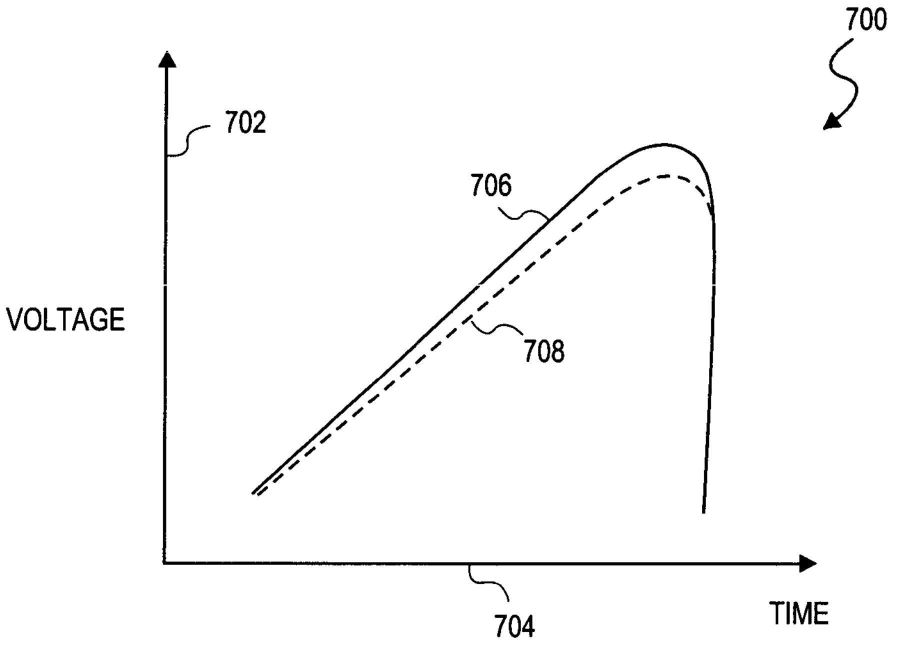
FIG. 7 is a graph of the voltage of a fluid-ejection nozzle over time as the nozzle is being fired to eject fluid, according to an embodiment of the invention.

FIG. 7 shows a graph 700 of the voltage of a fluid-ejection nozzle as a function of time as the nozzle is fired, according to an embodiment of the invention. The y-axis 702 denotes voltage, and the voltage may range from 20.0–25.0 volts at the bottom of the y-axis 702 to 22.0–25.5 volts at the top of the y-axis 702. The x-axis 704 denotes time, and the time may range from 0 seconds at the left of the x-axis 704 to 980 nanoseconds at the right of x-axis 704. The voltage of the fluid-ejection nozzle as measured by the y-axis 702 can in one embodiment be the output voltage of a current-to-voltage converter, where the input current to the converter is the current through the nozzle. The voltage indicated by the y-axis 702 is thus not the voltage applied to the nozzle, but can rather be the output voltage of a mechanism, such as a current-to-voltage converter, to measure current through the nozzle. That is, the voltage of the fluid-ejection nozzle can be defined in one embodiment as the output voltage of a mechanism that directly measures current through the nozzle, and outputs a proportional and corresponding voltage as a result.

When the fluid-ejection nozzle is fired, the voltage of the fluid-ejection nozzle increases and then suddenly drops off consistent with whether the nozzle successfully ejects a fluid drop or not. When the nozzle successfully ejects a fluid drop, the voltage follows the dotted line segment 708. When the nozzle partially or completely fails to eject a fluid drop, the voltage follows the line segment 706. At any given point in time before the voltage drops off, the voltage of the nozzle is lower when the nozzle is successfully ejecting a fluid drop than when the nozzle is failing to eject a fluid drop. The difference along the y-axis 702 between the segments 706 and 708 is referred to as the detection margin. The specific value for the detection margin depends on the manner by which the voltage is actually measured.

Figure 8:
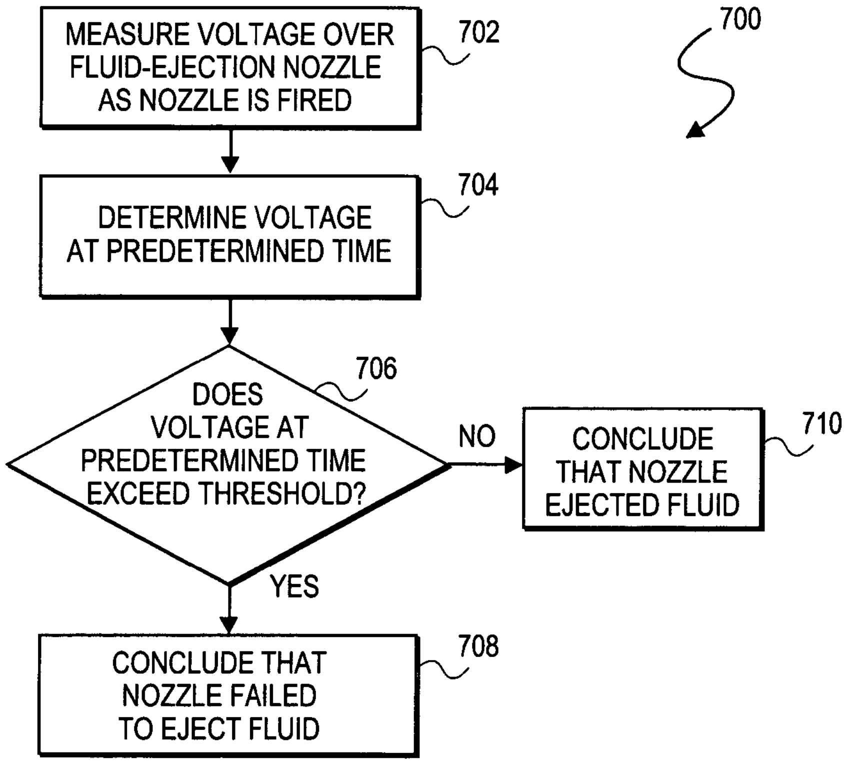
FIG. 8 is a flowchart of a method for using the voltage of a fluid-ejection nozzle over time to determine whether the nozzle has ejected fluid upon being fired, according to an embodiment of the invention.

FIG. 8 shows a method 800 for determining whether a fluid-ejection nozzle has successfully ejected fluid upon being fired by determining the voltage of the nozzle at a predetermined time, according to an embodiment of the invention. First, the voltage of the fluid-ejection nozzle is measured over time as the nozzle is fired (702). Measuring the voltage can be considered as indirectly measuring the temperature and/or the resistance of the nozzle, where the temperature and/or the resistance is proportional to the voltage of the nozzle.

The voltage at a predetermined time after the fluid-ejection nozzle began to attempt to eject fluid is determined from this information (704). If the voltage at the predetermined time exceeds a threshold (706), then the method 700 concludes that the fluid-ejection nozzle has completely or partially failed to eject a fluid drop (708). Otherwise, the method 700 concludes that the fluid-ejection nozzle has successfully ejected a fluid drop (710). For a given predetermined time, the threshold may be determined between the line segments 706 and 708 of FIG. 7.

Figure 9:
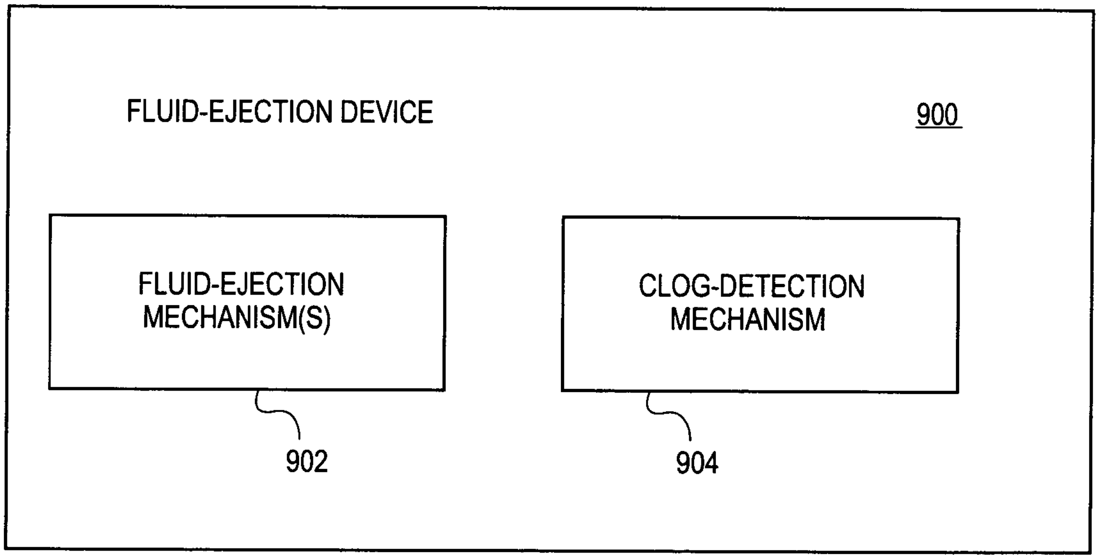
FIG. 9 is a block diagram of a fluid-ejection device, according to an embodiment of the invention.

In an alternative embodiment of the invention, the embodiment of FIGS. 8 and 9 instead are performed with respect to the firing resistance at a predetermined time after the fluid-ejection nozzle has begun to attempt to eject fluid. That is, in lieu of determining the voltage at the predetermined time, resistance is determined at the predetermined time. This resistance is compared with a threshold to conclude whether the fluid-ejection nozzle has successfully ejected fluid.

Fluid-Ejection Device and Conclusion

FIG. 9 shows a block diagram of a fluid-ejection device 900, according to an embodiment of the invention. The fluid-ejection device 900 includes one or more fluid-ejection mechanisms 902 and a clog-detection mechanism 904. The device 900 may also include other components, in addition to and/or in lieu of those depicted in FIG. 9. The fluid-ejection mechanisms 902 may in one embodiment be inkjet-printing mechanisms, such as inkjet printheads, such that the fluid-ejection device 900 is an inkjet-printing device, such as an inkjet printer.

The fluid-ejection mechanisms 902 each include one or more fluid-ejection nozzles, such as inkjet-printing nozzles in the embodiment where the fluid-ejection device 900 is an inkjet-printing device. The clog-detection mechanism 904 contains the hardware and/or software needed to implement any of the methods of embodiments of the invention that have been described in the previous sections of the detailed description. The clog-detection mechanism 904 thus determines whether a fluid-ejection mechanism is able to successfully eject fluid upon firing, without having to either move the fluid-ejection mechanisms 902 or take them offline.

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A method comprising:

determining at least one of a temperature and a firing resistance of a thermal fluid-ejection nozzle as the fluid-ejection nozzle is fired, comprising one or more of:

determining a firing resistance profile over voltage as the fluid-ejection nozzle is fired;

measuring the firing resistance of the fluid-ejection nozzle over time and indirectly measuring the temperature of the fluid-nozzle as proportional to the firing resistance of the fluid-ejection nozzle;

indirectly measuring the temperature and the firing resistance of the fluid-ejection nozzle by determining a voltage of the fluid-ejection nozzle over time; and, determining whether the fluid-ejection nozzle ejected fluid upon firing based on the at least one of the temperature and the firing resistance of the fluid-ejection nozzle.

2. The method of claim 1, wherein determining the at least one of the temperature and the firing resistance of the fluid-ejection nozzle comprises determining at least one of a temperature profile and a firing resistance profile over time as the fluid-ejection nozzle is fired.

3. The method of claim 2, wherein determining whether the fluid-ejection nozzle ejected fluid upon firing comprises:

comparing the at least one of the temperature profile and the firing resistance profile to a predetermined profile of a clogged fluid-ejection nozzle and a predetermined profile of an unclogged fluid-ejection nozzle;

where the at least one of the temperature profile and the firing resistance profile match the predetermined profile of the clogged fluid-ejection nozzle, concluding that the fluid-ejection nozzle failed to eject the fluid upon firing; and, where the at least one of the temperature profile and the firing resistance profile match the predetermined profile of the unclogged fluid-ejection nozzle, concluding that the fluid-ejection nozzle ejected the fluid upon firing.

4. The method of claim 1, wherein determining whether the fluid-ejection nozzle ejected fluid upon firing comprises:

comparing the firing resistance profile to a predetermined profile of a clogged fluid-ejection nozzle and a predetermined profile of an unclogged fluid-ejection nozzle;

where the firing resistance profile matches the predetermined profile of the clogged fluid-ejection nozzle, concluding that the fluid-ejection nozzle failed to eject the fluid upon firing; and, where the firing resistance profile matches the predetermined profile of the unclogged fluid-ejection nozzle, concluding that the fluid-ejection nozzle ejected the fluid upon firing.

5. The method of claim 1, wherein determining at least one of the temperature and the firing resistance of the fluid-ejection nozzle comprises measuring the temperature of the fluid-ejection nozzle over time.

6. The method of claim 5, wherein determining whether the fluid-ejection nozzle ejected fluid upon firing comprises:

determining a transition temperature of the fluid-ejection nozzle of fluid nucleation based on the temperature of the fluid-ejection nozzle;

determining whether a time at which the transition temperature of the fluid-ejection nozzle occurs exceeds a threshold; and, where the time at which the transition temperature occurs exceeds the threshold, concluding that the fluid-ejection nozzle failed to eject the fluid upon firing; and, otherwise concluding that the fluid-ejection nozzle ejected the fluid upon firing.

7. The method of claim 1, wherein determining whether the fluid-ejection nozzle ejected fluid upon firing comprises:

determining whether the firing resistance of the fluid-ejection nozzle at a predetermined time after firing exceeds a threshold;

where the firing resistance at the predetermined time after firing exceeds the threshold, concluding that the fluid-ejection nozzle failed to eject the fluid upon firing; and, otherwise concluding that the fluid-ejection nozzle ejected the fluid upon firing.

8. The method of claim 1, wherein determining whether the fluid-ejection nozzle ejected fluid upon firing comprises determining refill time of a chamber of the fluid-ejection nozzle after two or more firing pulses and concluding that the fluid-ejection nozzle failed to eject the fluid upon firing where the refill time is greater than a threshold.

9. The method of claim 1, wherein determining whether the fluid-ejection nozzle ejected fluid upon firing comprises:

determining whether the voltage of the fluid-ejection nozzle at a predetermined time after firing exceeds a threshold;

where the voltage at the predetermined time after firing exceeds the threshold, concluding that the fluid-ejection nozzle failed to eject the fluid upon firing; and, otherwise concluding that the fluid-ejection nozzle ejected the fluid upon firing.

10. The method of claim 1, where the fluid-ejection nozzle is an inkjet-printing nozzle and the fluid is ink.

11. A computer-readable medium having a computer program stored thereon to perform a method comprising:

determining a firing resistance profile of a thermal fluid-ejection nozzle over voltage as the fluid-ejection nozzle attempts to eject fluid;

comparing the firing resistance profile to a predetermined profile of a clogged fluid-ejection nozzle and a predetermined profile of an unclogged fluid-ejection nozzle;

where the firing resistance profile matches the predetermined profile of the clogged fluid-ejection nozzle, determining that the fluid-ejection nozzle failed to eject the fluid; and, where the firing resistance profile matches the predetermined profile of the unclogged fluid-ejection nozzle, determining that the fluid-ejection nozzle ejected the fluid.

12. The medium of claim 11, where the fluid-ejection nozzle is an inkjet-printing nozzle and the fluid is ink.

13. A computer-readable medium having a computer program stored thereon to perform a method comprising:

measuring a temperature of a fluid-ejection nozzle over time as the fluid-ejection nozzle attempts to eject fluid;

determining a transition temperature of the fluid-ejection nozzle of fluid nucleation based on the temperature of the fluid-ejection nozzle as measured over time;

determining whether a time at which the transition temperature of the fluid-ejection nozzle occurs exceeds a threshold;

where the time at which the transition temperature occurs exceeds the threshold, concluding that the fluid-ejection nozzle failed to eject the fluid; and, otherwise concluding that the fluid-ejection nozzle ejected the fluid.

14. The medium of claim 13, where the fluid-ejection nozzle is an inkjet-printing nozzle and the fluid is ink.

15. A computer-readable medium having a computer program stored thereon to perform a method comprising:

determining a voltage of a fluid-ejection nozzle over time as the fluid-ejection nozzle attempts to eject fluid;

determining whether the voltage of the fluid-ejection nozzle at a predetermined time after the fluid-ejection nozzle began to attempt to eject the fluid exceeds a threshold;

where the voltage at the predetermined time exceeds the threshold, concluding that the fluid-ejection nozzle failed to eject the fluid; and, otherwise concluding that the fluid-ejection nozzle ejected the fluid.

16. The medium of claim 15, where the fluid-ejection nozzle is an inkjet-printing nozzle and the fluid is ink.

17. A thermal fluid-ejection device comprising:

at least one thermal fluid-ejection mechanism, each fluid-ejection mechanism having a plurality of thermal fluid-ejection nozzles; and, a mechanism to compare a predetermined profile of firing resistance over voltage to individual of profiles of firing resistance over voltage determined for corresponding of the plurality of thermal fluid-ejection nozzles to detect clogging.

18. The device of claim 17, wherein each fluid-ejection mechanism is an inkjet-printing mechanism having a plurality of inkjet-printing nozzles, such that the fluid-ejection device is an inkjet-printing device.

19. A thermal fluid-ejection device comprising:

at least one thermal fluid-ejection mechanism, each fluid-ejection mechanism having a plurality of thermal fluid-ejection nozzles; and, a mechanism to determine whether any of the plurality of fluid-ejection nozzles of the at least one fluid-ejection mechanism has clogged by determining a voltage of each fluid-ejection nozzle over time as the fluid-ejection nozzle is fired.

20. The device of claim 19, wherein each fluid-ejection mechanism is an inkjet-printing mechanism having a plurality of inkjet-printing nozzles, such that the fluid-ejection device is an inkjet-printing device.

* * * * *